B. F. STURTEVANT.
JOURNAL-BOX.
No. 189,881. Patented April 24, 1877.
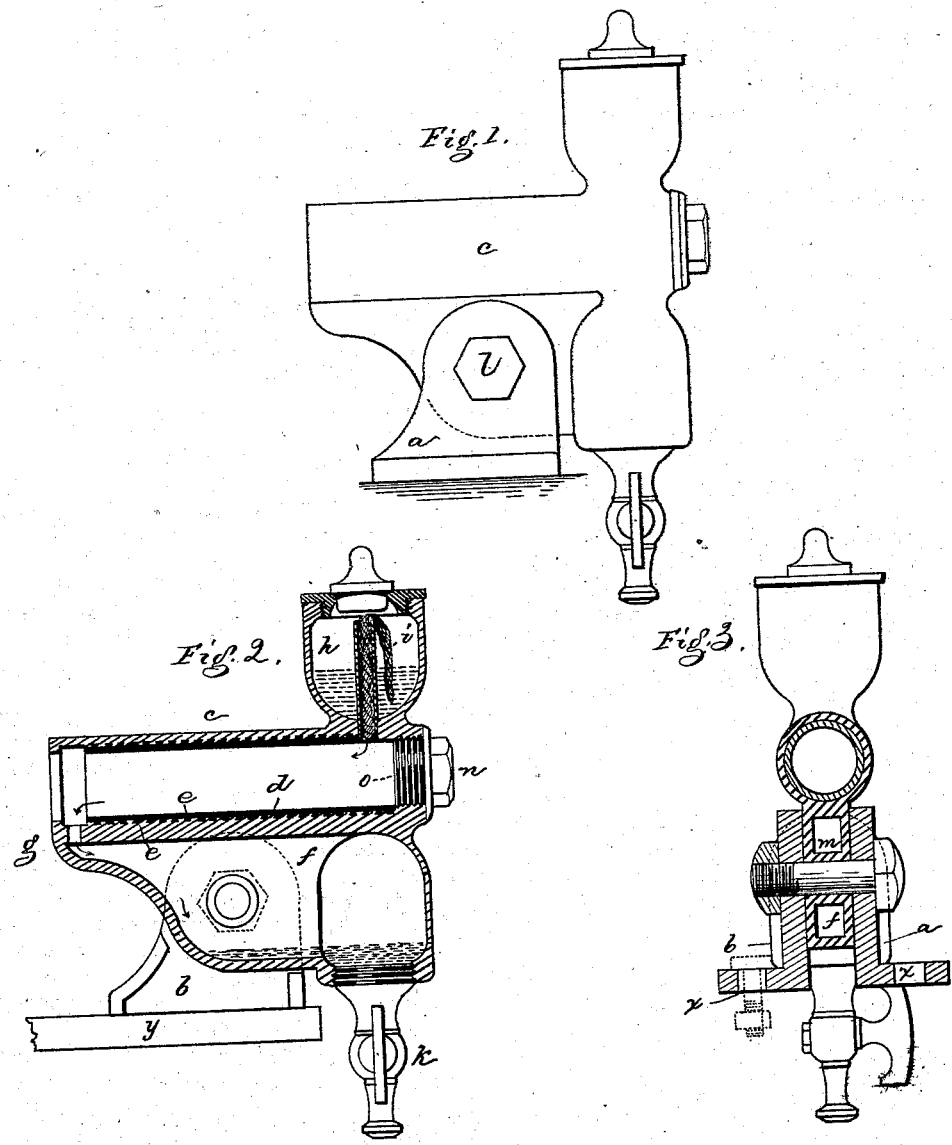
Witnesses.
L. H. Latimer.
W. J. Pratt.
Inventor.
Benjamin F. Sturtevant
per Crosby & Gregory.
Att'ys.

UNITED STATES PATENT OFFICE.

BENJAMIN F. STURTEVANT, OF BOSTON, MASSACHUSETTS.

IMPROVEMENT IN JOURNAL-BOXES.

Specification forming part of Letters Patent No. 189,881, dated April 24, 1877; application filed January 10, 1877.

*To all whom it may concern:*

Be it known that I, BENJAMIN F. STURTEVANT, of Boston, county of Suffolk, and State of Massachusetts, have invented Improvements in Journal-Boxes, of which the following is a specification:

This invention relates to journal-boxes especially adapted to sustain short shafts, as the shafts of blast-fans.

The invention consists in a journal-box provided with a knuckle-joint between the bearing portion of the journal-box and the supporting-stands, whereby when the bearing is placed in perfect line with the shaft the joint may be tightened, thereby fixing or fastening the bearing portion with relation to the stands and shaft, making the bearing and stands substantially as rigid as if cast together without a joint.

Ordinarily the boxes and stands are cast rigidly together, and there is no provision in the box itself to adapt the bearing portion to the line of the shaft to be held by it, and all such bearings have to be specially fitted and adjusted to the line of the shaft.

This knuckle-joint in the journal-box is of great advantage when setting up new blowers, and is specially advantageous when putting together blowers that have been repaired, or in which new boxes are added or old boxes newly lined.

Figure 1 represents in side view a bearing constructed in accordance with this invention; Fig. 2, a longitudinal vertical section; and Fig. 3, a vertical cross-section through the knuckle-joint.

In the drawing, *a b* represent the stands to rest upon suitable abutments or rests. The bearing portion *c* is lined, preferably, with Babbitt or other metal, *d*, run into dovetailed annular grooves *e* in the bearing, the metal being thereby firmly secured therein. A portion of the journal below the bearing is made hollow, as shown at *f*, and communicates, as at *g*, with the bearing portion *c*. Oil admitted at the cup *h*, and taken up by the wick *i*, is discharged upon the shaft running in the bearing portion, and thence it flows along the shaft through passage *g* into the oil-receptacle *f*, from which it may be removed to be reused through the cock or other suitable discharge *k*. The bearing portion *c* is sustained between the stands by a bolt, *l*, fitting a hole made in a hub, *m*. When the bearing is placed in line with the shaft which is to run in it, this bolt is tightened, thereby locking the bearing, and stands firmly together as if cast in one piece. A plug, *n*, preferably screw-threaded and with a smooth end, *o*, is placed at the outer end of the bearing portion as a face, against which the end of the shaft in the box will rest. The stands are provided with bolt-holes *x x* to receive bolts that confine the stands upon a suitable rest, as at *y*. The bolts will be made smaller in diameter than the holes *x*, so as to allow the stands to be turned a little on the rest *y*.

I claim—

1. The combination, with the stands, of the bearing portion, pivoted to the stand, and adapted to be clamped rigidly and immovably to the stands when the bearing portion is placed in line, substantially as described.

2. The combination, with the stands, of the pivoted bearing portion, provided with the oil-receptacle *f*, passage *g*, and discharge-outlet *k*, substantially as described.

3. A pivoted bearing portion and stands, substantially as described, and a locking device to secure the bearing portion and stands, in combination with an end plug to stop up one end of the bearing, substantially as set forth.

4. The bearing portion stopped at its outer end, and provided with an opening at its inner end for exit of oil, in combination with an oil-supplying reservoir, and an oil-receiving reservoir, provided with a discharge-outlet to remove the oil, substantially as described.

In testimony whereof I have signed my name to this specification in the presence of two subscribing witnesses.

BENJ. F. STURTEVANT.

Witnesses:
G. W. GREGORY,
E. C. PERKINS.